Nov. 9, 1937.  E. B. ROUSSEAU  2,098,884
ELECTRIC RAT TRAP
Filed Oct. 15, 1936

Inventor
E. B. Rousseau
By L. F. Randulph
Attorney

Patented Nov. 9, 1937

2,098,884

UNITED STATES PATENT OFFICE 2,098,884

ELECTRIC RAT TRAP

Elbert B. Rousseau, Nashville, Tenn.

Application October 15, 1936, Serial No. 105,791

3 Claims. (Cl. 43—98)

This invention relates to a trap adapted to electrically exterminate rats or other rodents.

It is particularly aimed to provide a novel construction wherein the rodents will wet or moisten their feet as they travel over the trap so as to be in a moist condition when bridging an electric circuit so that a lower voltage will be sufficient to electrocute them. It is particularly aimed to provide such a moistening means in connection with a 110 volt circuit, since the latter is a more universal voltage.

The more specific objects and advantages will become apparent from a consideration of the description following taken in connection with accompanying drawing illustrating an operative embodiment.

In said drawing:—

Figure 1:
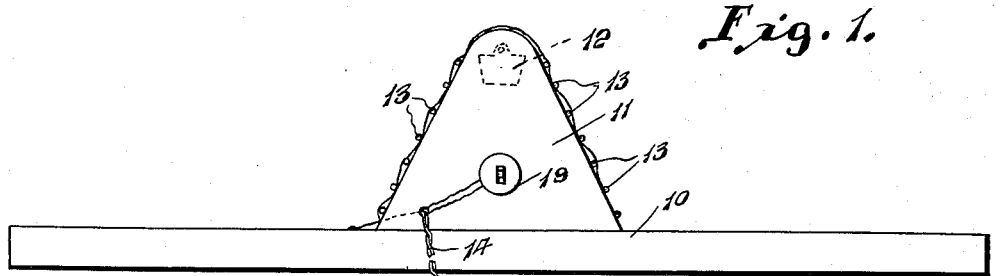
Figure 1 is a view of the trap in side elevation.
Figure 2:
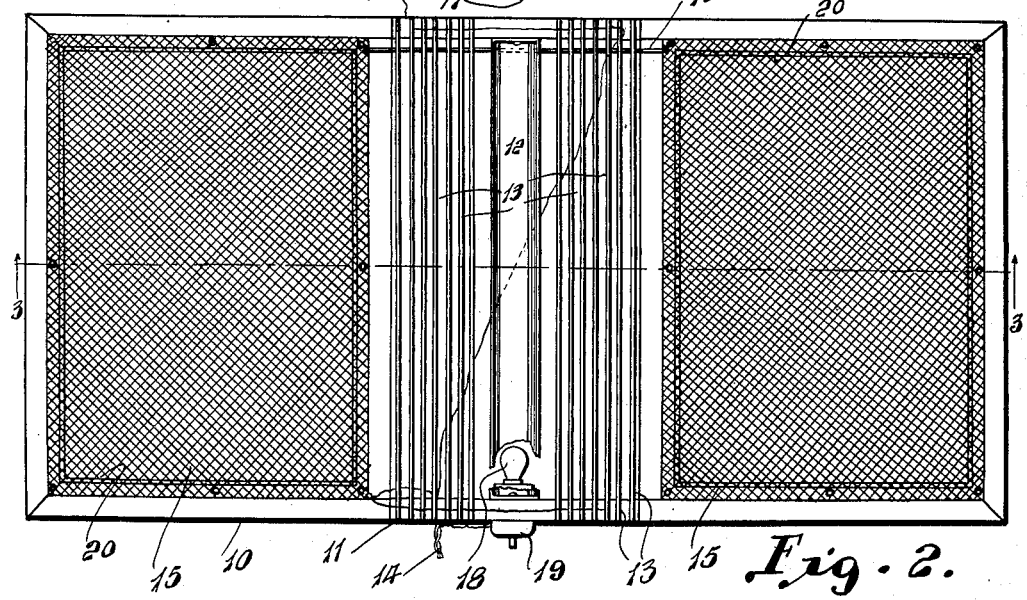
Figure 2 is a plan view thereof.
Figure 3:
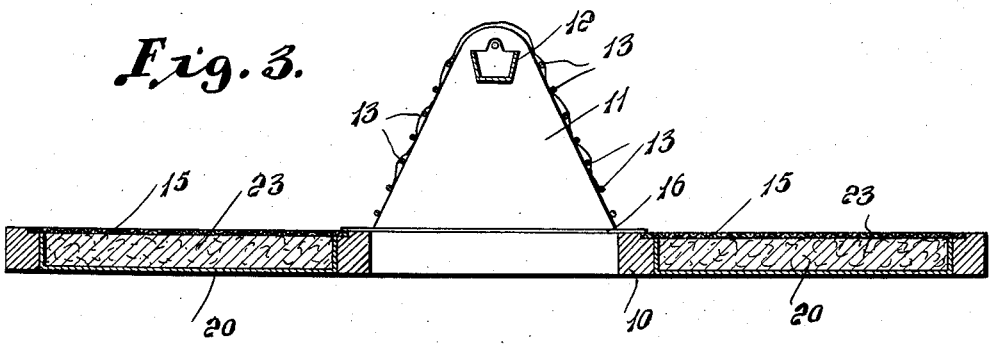
Figure 3 is a longitudinal sectional view taken on the line 3—3 of Figure 2.

Referring specifically to the drawing wherein like reference characters designate like or similar parts, the improved trap comprises a base 10 at the sides of which, substantially mid-way of the ends, supports or uprights 11 are secured and to which a bait receptacle 12 is secured, extending transversely of the device.

Suitably supported on the uprights 11, are electrode rods 13, the same preferably being parallel as shown. Said electrode rods 13 are alternately positive and negative, and are connected so that when any adjacent pair are bridged by the animal or rodent, the same will be electrocuted by closing an electric circuit through its body. Said electrodes 13 are connected in any suitable electric circuit represented by the wires 14, and which circuit includes metallic screens 15, secured to the frame or base 10, preferably on the negative side of the circuit and connected by a jumper at 16. The wires 14 carry a plug 17 whereby the same may be detachably connected in any suitable socket or plug, usually of 110 volts.

Said circuit includes a telltale lamp at 18, adapted to be energized when the trap is attached in an electric circuit, through the closing and opening of a suitable switch 19, to ascertain if current will flow through the electric circuit, it being clear that when the trap is set, the switch 19 is open and the lamp extinguished.

On opposite sides of the electric electrocuting means described, trays 20 are removably disposed, and inserted through the openings of the base or frame 10. Such pans are preferably filled with sponge or equivalent soft or absorbent material at 23, and the pans are filled with water or other liquid. The screens 15 are in contact with the sponge material 23, whereby the water or liquid will be applied to the screens by capillarity, to insure a good electrical contact with the feet of the victim.

In the use of the device, with the plug 17 connected in an electric circuit, and bait placed in the receptacle 12, a rodent lured onto a screen 15, will have its feet wet or moistened by travel thereover and hence when that screen and one of the electrodes 13 are bridged, or two of the electrodes 13 of opposite polarity are bridged, the animal will be electrocuted, it being possible to use less voltage than normally necessary to insure electrocution, because of the fact that the feet of the animal will be wet when the electric circuit is closed through its body.

Various changes may be resorted to provided they fall within the spirit and scope of the invention.

I claim as my invention:—

1. A trap of the class described having electric circuit means including electrodes to be bridged by a rodent, one of said electrodes being a screen, over which the rodent is adapted to pass, means for maintaining said screen in a moist condition, comprising a receptacle, and absorbent means in the receptacle in contact with the screen.

2. A trap of the class described having electric circuit means including electrodes to be bridged by a rodent, one of said electrodes being a screen, over which the rodent is adapted to pass, means for maintaining said screen in a moist condition, comprising a receptacle, absorbent means in the receptacle in contact with the screen, a base frame mounting said electric circuit means, said receptacle comprising a pan insertable from the bottom of said frame, and said screen engaging said flange.

3. A trap of the class described having electric circuit means including electrodes to be bridged by a rodent, one of said electrodes being a screen, over which the rodent is adapted to pass, means for maintaining said screen in a moist condition, comprising a receptacle, absorbent means in the receptacle in contact with the screen, a base frame mounting said electric circuit means, said receptacle comprising a pan insertable from the bottom of said frame, uprights on the base frame supporting the electrode rods, bait retaining means on the uprights, and a telltale lamp in the circuit carried by one of the uprights.

ELBERT B. ROUSSEAU.